United States Patent

[11] 3,588,665

| | | |
|---|---|---|
| [72] | Inventors | Frank G. Willard<br>Monroeville;<br>James F. Sutherland, Pittsburgh, Pa. |
| [21] | Appl. No. | 813,228 |
| [22] | Filed | Apr. 3, 1969 |
| [45] | Patented | June 28, 1971 |
| [73] | Assignee | Westinghouse Electric Corporation<br>Pittsburgh, Pa. |

[54] TRANSFORMER INVERTER
11 Claims, 1 Drawing Fig.

[52] U.S. Cl. ................................. 321/2,
321/45, 331/113
[51] Int. Cl. ................................. H02m 3/22
[50] Field of Search ................................. 321/43-
—45; 331/113, 113.1; 307/313

[56] References Cited
UNITED STATES PATENTS

| | | | |
|---|---|---|---|
| 3,080,534 | 3/1963 | Paynter | 331/113(.1) |
| 3,233,161 | 2/1966 | Sikorra | 321/45X |
| 3,237,125 | 2/1966 | Budd, Jr. | 331/113(.1) |
| 3,237,128 | 2/1966 | Photiades | 331/113(.1) |
| 3,434,034 | 3/1969 | Garber et al. | 321/47X |

OTHER REFERENCES
IBM TECHNICAL DISCLOSURE BULLETIN, Vol. 9, No. 10, March, 1967, p. 1462, Copy in 307/313.

*Primary Examiner*—William M. Shoop, Jr.
*Attorneys*—F. H. Henson, R. G. Brodahl and C. J. Paznokas

ABSTRACT: Described is a transformer-type voltage inverter, typically used as a low dissipation, high current voltage reducer for integrated circuits, which employs a simple two-winding transformer as a feedback and timing means.

PATENTED JUN 28 1971　　　3,588,665
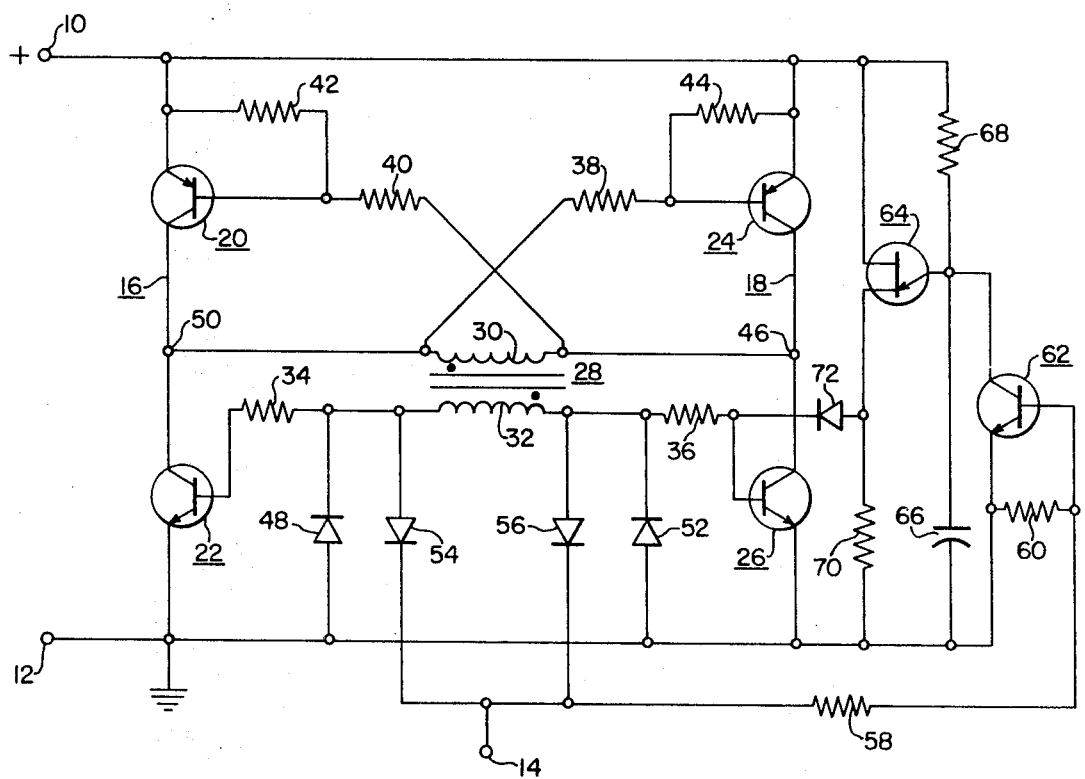
WITNESSES
Theodore F. Wrobel
James F. Young
INVENTORS
Frank G. Willard and
James F. Sutherland
BY
ATTORNEY

TRANSFORMER INVERTER

BACKGROUND OF THE INVENTION

While not limited thereto, the present invention is particularly adapted for use in converting direct current power a relatively high voltage, typically 24 volts, to a source of high current, low voltage power of about 5 volts for driving integrated circuits. In the past, inverters of this general type have been devised utilizing two sets of transistors which alternately switch a source of direct current voltage across the halves of a center-tapped primary winding of a square loop saturable core transformer, causing current to flow in the winding halves in opposing directions. Examples of such inverters can be found, for example, by reference to U.S. Pat. No. 2,826,731. The multivibrator switching action of the transistors in such circuits is controlled by a pair of feedback windings of opposite polarity associated with the square loop saturable transformer such that the conduction and nonconduction of one set of transistors is responsive to the nonconduction and conduction, respectively, of the other set of transistors. A square-wave voltage is produced at an output winding on the transformer in response to alternate switching of the transistors. This voltage may be used in its alternating current form or may be rectified to provide a direct current voltage.

SUMMARY OF THE INVENTION

As one object, the present invention seeks to provide a transformer-type voltage inverter which is simpler in construction, uses less expensive components, is more reliable in operation than prior art inverters of this type, and which additionally enables voltage to be stepped down.

More specifically, an object of the invention is to provide a transformer inverter which employs a simple saturable transformer of the nonsquare loop-type which requires only two nontapped windings as feedback and timing means, the output being derived across one of said windings. As will be seen, this eliminates the necessity for two separate secondary feedback windings and/or the critically center-tapped transformer of prior art devices.

A further object of the invention is to provide a transformer inverter of the type described wherein a transformer is used to drive only two of four transistors in a bridge circuit configuration, the remaining two transistors being direct driven by the first two.

Still another object of the invention is to provide a transformer-type voltage inverter capable of being initially triggered by a relaxation oscillator which is operative only when the inverter output is absent. This avoids losses occurring in most prior art inverters due to the requirement of Class A operation to produce a starting transient.

In accordance with the invention, a voltage inverter is provided including a pair of input terminals adapted for connection to a source of direct current voltage. A first circuit branch is connected between the input terminals and includes the emitters and collectors of a first pair of series-connected switching transistors. Also connected between the input terminals is a second circuit branch which includes the emitters and collectors of a second pair of series-connected switching transistors. The circuitry incorporates a simple saturable transformer of the nonsquare loop-type having only two windings, one of which may be called the primary winding and the other of which may be called the secondary winding and across which the output appears. Opposite ends of the primary winding are connected to the junctions of the two transistor switching devices in the respective circuit branches while opposite ends of the secondary winding are connected to the bases of one of the two transistors in the respective circuit branches. By connecting opposite ends of the primary winding to the bases of the other two of the transistors in the respective circuit branches, one transistor in a circuit branch can be made to conduct while the other is cut off and vice versa, with the current flowing between the input terminals through a conducting transistor in one circuit branch, thence through the primary winding of the transformer and finally through a conducting transistor in the other circuit branch.

With the arrangement described, a square-wave output will appear across the secondary winding; however this may be rectified to produce a direct current voltage. Assuming that the turns ratio of the winding on the transformer is adjusted properly, the output voltage can be reduced with respect to the input voltage.

Further, in accordance with the invention, a relaxation oscillator is provided which initially triggers one of the transistors in the two circuit branches into conduction, thereby starting the multivibrator switching action of the circuit. However, once an output appears across the secondary winding, and assuming that this output is rectified, it can be utilized to disable the relaxation oscillator such that it will not interfere with the normal multivibrator switching action of the circuit.

The above and other objects and features of the invention will become apparent from the following detailed description taken in connection with the accompanying single FIGURE drawing which schematically illustrates one embodiment of the invention.

DESCRIPTION OF PREFERRED EMBODIMENT

With reference now to the drawing, the circuit shown includes a pair of input terminals 10 and 12 adapted for connection to a source of direct current voltage, not shown. The terminal 12 is connected to a source of common potential (i.e., ground). As was explained above, it is the purpose of the circuit to reduce the voltage applied to terminals 10 and 12 from a valve of, for example, about 24 volts to a valve of about 5 volts, the output voltage appearing between terminal 14 and ground.

Connected between the input terminals 10 and 12 is a pair of parallel circuit branches 16 and 18. Circuit branch 16 includes the emitters and collectors of a pair of transistors 20 and 22. In the particular embodiment of the invention shown herein, the transistor 20 is of the PNP type, while transistor 22 is of the NPN type. Similarly, the circuit branch 18 includes the emitters and collectors of two transistors 24 and 26, transistor 24 being of the PNP type like transistor 20 and transistor 26 being of the NPN type like transistor 22. It will be further noted that the emitters of transistors 20 and 24 are both connected to the input terminal 10, while the emitters of transistors 22 and 26 are both connected to the grounded input terminal 12.

The circuit includes a simple transformer 28 having a first winding 30 which, for purposes of explanation, may be called a primary winding and a second winding 32 which may be called a secondary winding. Opposite ends of the first winding 30 are connected to the junctions of the collectors of transistors 20, 22 and 24, 26 in the respective circuit branches 16 and 18. One end of the second winding 32 is connected through resistor 34 to the base of NPN transistor 22; while the other end of the second winding 32 is connected through resistor 36 to the base of NPN transistor 26. In a somewhat similar manner, the left end of the first winding 30, associated with circuit branch 16, is connected through resistor 38 to the base of transistor 24, while the right end of the same first winding 30, associated with circuit branch 18, is connected through resistor 40 to the base of transistor 20 in circuit branch 16. Resistors 42 and 44 are connected in shunt with the emitter-base junctions of PNP transistors 22 and 24, respectively.

For purposes of illustration, let us assume that when a direct current potential is initially applied across input terminals 10 and 12, a transient condition occurs which produces the polarities shown across winding 30 and 32. That is, the left end of winding 30 is positive while the right end of winding 32 is likewise positive. Under these conditions, the NPN transistor 26 will be driven into conduction, thereby presenting a short circuit between ground and point 46. As a result, the base of PNP transistor 20 in circuit branch 16 is also essentially grounded through resistor 40 causing the transistor 20 to conduct. Current now flows from terminal 10 through the emitter and collector of transistor 20, through the first winding 30, and through the collector and emitter of transistor 26 to ground. At this time, the diode 48 clamps the base of NPN transistor 22 to ground such that it cannot conduct. The aforesaid condition will persist with transistors 20 and 26 conducting until the core of transformer 28 saturates. When the transformer 28 reaches saturation, the flux ceases to change. Induced voltage, being proportional to rate-of-change of flux, collapses. This removes base drive voltage from transistor 26 which, in turn, cuts off. Now, primary current can no longer flow; and base drive for the previously conducting upper transistor 20 is removed. The transformer core has low enough remanence so that a direct result of primary current reduction, the flux drops back from saturation, giving rise to a rate of change of flux and hence an induced voltage, opposite in polarity to the previous situation. This causes the other, lower transistor 22 to conduct, which causes the other upper transistor 24 to conduct also. Now, primary current starts to flow opposite to that in the previous situation.

When transistor 22 conducts, point 50 becomes grounded; and the base of PNP transistor 24 is also essentially grounded through resistor 38. Transistor 24 now conducts and current flows from input terminal 10 through the emitter and collector of transistor 24, through the first winding 30 and the collector and emitter of transistor 22 to ground. At this time, the diode 52 clamps the base of transistor 26 to ground such that it cannot conduct. Again, the current flow through the winding 30 will cause the transformer core 28 to saturate; whereupon base drive voltage is removed from the lower transistor 22; transistor 24 also cuts off; and conduction is again initiated in transistors 20 and 26. In this manner, it will be appreciated that the transistors 20, 26 and 24, 22 will alternately conduct, thereby producing a series of essentially square waves across the second winding 32. The transformer core should have low enough remanence to provide the described operation.

In the embodiment of the invention shown herein, the square wave appearing across the winding 32 is rectified by means of diodes 48 and 52 along with diodes 54 and 56 to produce a direct current voltage between output terminal 14 and ground proportional to the square wave or alternating current voltage appearing across winding 32. In order to provide conversion from a particular input voltage to a lower output voltage, the turn ratio of transformer 28 is arranged to provide a stepdown voltage ratio, whereby the output voltage of winding 32 is less than the input voltage of winding 30.

From the description thus far it should be apparent that the connections and operation result in a circuit configuration having oppositely poled and alternately operable current paths connected between the input terminals 10 and 12. One current path includes in the order named, input terminal 10, the emitter-collector path of transistor 20, the primary winding 30, the emitter-collector path of transistor 26 and input terminal 12. The second current path includes the input terminal 10, the emitter-collector path of transistor 24, the primary winding 30, the emitter-collector path of transistor 22, and input terminal 12.

It should also be noted that each transistor is connected in the common emitter configuration. Transistors 20 and 24 are connected in the common emitter mode because they have to perform an inversion function. Transistors 22 and 26 are connected in the common emitter mode in the stepdown case because they must have a voltage gain in order to switch the high supply voltage with the relatively low voltage. For the stepup case, transistors 22 and 26 may be connected in either common emitter mode or common collector mode.

The foregoing description of operation assumed that a transient would initially trigger transistor 22 or transistor 26 into conduction. As shown, the direct current voltage appearing in terminal 14 is coupled through resistor 58 and applied via resistor 60 between the base and emitter of a transistor 62. The collector of transistor 62 is connected to the emitter electrode of a unijunction transistor 64 which, together with capacitor 66, resistor 68 and resistor 70 forms a relaxation oscillator. As long as no direct current output appears at terminal 14, the relaxation oscillator will produce oscillations, the positive cycles of which are coupled through diode 72 to the base of transistor 26. Hence, and assuming that a direct current voltage has just been applied to terminals 10 and 12, the relaxation oscillator will cause transistor 26 to conduct and initiate the multivibrator switching action described above. However, as soon as an output appears at terminal 14, the direct current voltage coupled to the base of transistor 62 will cause it to conduct, thereby grounding the emitter of the relaxation oscillator and removing the pulses applied to the base of transistor 26, whereupon the multivibrator switching action described above will take effect.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that the PNP and NPN transistors could be reversed and that the output voltage could be stepped up rather than down by adjusting the turns ratio of transformer 28.

We claim:

1. In a voltage inverter, the combination of a pair of input terminals adapted for connection to a source of direct current voltage, a first circuit branch connected between said input terminals and including the emitters and the collectors of a first pair of series-connected switching transistors, a second circuit branch connected between said input terminals and including the emitters and collectors of a second pair of series-connected switching transistors, a transformer having only two windings, each of said windings having connection terminals only at the opposite ends thereof, means connecting opposite ends of one of said windings to the junctions of the two transistor switching devices in the respective circuit branches, means connecting the opposite ends of the other of said windings to the bases of the first of the two transistors in the respective current paths, means connecting the opposite ends of said one of the windings to the bases of the second of the two transistors in the respective circuit branches such that when a transistor in a circuit branch conducts the other will be cut off and vice versa with current flowing between said input terminals between a conducting transistor in one circuit branch thence through said one winding and finally through a conducting transistor in the other circuit branch, means for deriving an output across said other winding, and diodes connecting the base of each of said first transistors in the respective circuit branches to one of said input terminals whereby when one of said first transistors conducts the base of the remaining first transistor will be clamped at a potential where it cannot conduct.

2. The voltage inverter of claim 1 wherein one transistor in each circuit branch is of the PNP type while the other transistor in each circuit branch is of the NPN type.

3. The voltage inverter of claim 1 wherein a full-wave rectifier formed form four unidirectional current devices is connected across said other winding to derive a direct current output, said full-wave rectifier including as two of its unidirectional current devices the diodes connected between the bases of said first transistors and said one input terminal.

4. The voltage inverter of claim 3 wherein the voltage across said other winding is less than that across said one winding.

5. The voltage inverter of claim 3 including a relaxation oscillator for applying triggering pulses to the base of one of said switching transistors, and means for disabling said oscillator when an output appears across said full-wave rectifier.

6. The voltage inverter of claim 2 wherein the emitter of each PNP transistor in each current path is connected to one of said input terminals and the emitter of each NPN transistor in each current path is connected to the other of said input terminals, the collectors of the transistors in each current path being interconnected and connected to one end of said one winding.

7. The voltage inverter of claim 1 wherein said transformer is of the nonsquare loop-type 8. Electric converting apparatus comprising:
A. first and second input terminals for connection to a DC supply source;
B. first, second, third and fourth transistors;
C. a transformer having respective first and second windings provided with connection taps only at the ends thereof;
D. a first current path including in the order named, the first input terminal, the emitter-collector path of the first transistor, the first winding in one direction, the emitter-collector path of the second transistor, and the second input terminal;
E. a second current path including in the order named, the first input terminal, the emitter-collector path of the third transistor, the first winding in the opposite direction, the emitter-collector path of the fourth transistor, and the second input terminal;
F. means connecting opposite ends of the first winding to the bases of the first and third transistors;
G. means connecting opposite ends of the second winding to the bases of the second and fourth transistors;
H. means for deriving an output across the second winding; and
I. diodes connected between the bases and emitters of said second and fourth transistors to clamp the bases of said second and fourth transistors at the potential of said second input terminal when not conducting.

9. The combination of claim 8 wherein said first and third transistors are of one conductivity type while the second and fourth transistors are of the other conductivity type.

10. The combination of claim 8 wherein each transistor is operated in the common emitter mode.

11. The combination of claim 8 wherein the transformer has a low remanence core.